US006451912B1

(12) United States Patent
Kelch

(10) Patent No.: US 6,451,912 B1
(45) Date of Patent: Sep. 17, 2002

(54) POLYOLEFIN/COPOLYAMIDE RF ACTIVE ADHESIVE FILM

(75) Inventor: Robert H. Kelch, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/804,114

(22) Filed: Mar. 12, 2001

Related U.S. Application Data
(60) Provisional application No. 60/203,715, filed on May 12, 2000.

(51) Int. Cl.$^7$ ............................................. C08L 77/08
(52) U.S. Cl. ........................... 525/66; 525/179; 525/183
(58) Field of Search .................................... 525/66, 183

(56) References Cited

U.S. PATENT DOCUMENTS

| | | | |
|---|---|---|---|
| 3,442,975 A | | 5/1969 | Cawthon et al. |
| 4,132,690 A | | 1/1979 | Eernstman et al. ...... 260/23 AR |
| 5,317,059 A | * | 5/1994 | Chundury et al. ............. 525/66 |
| 5,321,079 A | | 6/1994 | Torre et al. .................... 525/66 |
| 5,321,119 A | | 6/1994 | Torre et al. .................. 528/338 |
| 5,352,741 A | * | 10/1994 | Diericky et al. ............. 525/183 |
| 5,627,223 A | | 5/1997 | Dehennau et al. ............ 524/47 |
| 5,849,843 A | * | 12/1998 | Laurin et al. .................. 525/66 |
| 5,939,512 A | * | 8/1999 | Gervasi et al. .............. 528/170 |
| 5,993,949 A | | 11/1999 | Rosenbaum et al. ........ 428/213 |
| 5,998,019 A | | 12/1999 | Rosenbaum et al. ........ 428/345 |
| 6,013,373 A | * | 1/2000 | Kuder et al. .............. 428/411.1 |

FOREIGN PATENT DOCUMENTS

| | | | |
|---|---|---|---|
| CA | 2039136 | 7/1992 | |
| DE | 3728334 A1 | 3/1988 | |
| EP | 193902 | 9/1986 | ............ C08K/3/22 |
| JP | 1-289861 | * 11/1989 | |
| WO | WO92/09415 | 6/1992 | ........... B29C/35/08 |
| WO | WO95/13918 | 5/1995 | ........... B32B/27/08 |
| WO | WO95/14739 | 6/1995 | ........... C08L/28/02 |
| WO | WO96/40512 | 12/1996 | ........... B32B/27/08 |

OTHER PUBLICATIONS

Siegmann et al, "Polyblends containing a liquid crystalline polymer", Polymer, vol. 26, pp. 1325–1330 (Aug. 1985).
Frihart et al, "Polyamide Processing Aids for Nylon", Plast. Copd. 1990, 13(3), 109–110.

* cited by examiner

*Primary Examiner*—Ana Woodward

(57) ABSTRACT

Flexible, halogen-free, high frequency-sealable films fabricated from a blend of a copolyamide and a polyolefin having a carboxylic acid or carboxylic acid anhydride functionality have sufficient copolyamide to yield a DLF of at least 0.05 at a frequency of 27 megahertz and serve as effective substitutes for flexible polyvinyl chloride films. The films may be mono-layer films or multi-layer films, especially where the high frequency-sealable films serve as outer or skin layers in multi-layer films. Products made from such monolayer and multi-layer films find utility in a number of applications, especially for medical device applications.

8 Claims, No Drawings

POLYOLEFIN/COPOLYAMIDE RF ACTIVE ADHESIVE FILM

CROSS-REFERENCE STATEMENT

This Application claims benefit of U.S. Provisional Application No. 60/203,715, filed May 12, 2000.

FIELD OF THE INVENTION

This invention relates to radio frequency (RF) susceptible, film-forming, polymer blend compositions, especially to compositions that are substantially free of halogen-containing polymers such as poly(vinyl chloride) or PVC. In other words, current analytical techniques do not reveal the presence of detectable quantities of chemically combined halogen. The invention particularly relates to mono-layer films fabricated from such compositions and coextruded multi-layer film structures incorporating at least one layer fabricated from such compositions. The invention more particularly relates to such compositions that comprise a copolyamide and an acid-functionalized polyolefin, and their use in such films and structures.

BACKGROUND OF THE INVENTION

Products manufactured from flexible PVC (f-PVC) enjoy a long history of use in a variety of end use applications, including those that rely upon its RF sealing capability, vapor or gas barriers, or flexibility. Concerns about the environmental impact of halogenated polymers such as f-PVC, particularly during their manufacture and disposal, spark efforts to develop halogen-free alternatives. Phthalate plasticizer use in f-PVC, typically at levels of 10–40 percent by weight (wt %), based on composition weight, triggers debates when f-PVC finds its way into medical products, toys for children and food packaging. The debates center upon the tendency of plasticizers to migrate from, or leach out of, f-PVC in use or over time.

Efforts to counter the concerns tend to focus upon olefin polymers such as polypropylene (PP), polyethylene (PE), styrenic block copolymers such as styrene/ethylene butene/ styrene or (SEBS), and ethylene copolymers such as ethylene/octene-1 or ethylene/vinyl acetate (EVA) copolymers. The olefin polymers match or approximate many physical properties exhibited by f-PVC and do so at a comparable cost. Films formed from such polymers require heat sealing as they have too low a dielectric loss factor (DLF) to facilitate high frequency (HF) sealing in general or RF sealing in particular.

Literature references describe various halogen-free polymers with dielectric properties that permit HF or RF welding or sealing. Such polymers include, for example, thermoplastic polyurethane (TPU); polyamide (nylon) and glycol modified polyester (PETG). However, these polymers cost more than PVC, making direct substitution for f-PVC economically unattractive. In addition, some alternate RF active polymers have a significantly higher tensile modulus or stiffness than f-PVC, making substitution in flexible film packaging or bag applications unfeasible.

Copolyamides, known to be RF active, suffer drawbacks in terms of inadequate physical properties and high cost relative to f-PVC. High number average molecular weight ($M_n$) polyamides, also known as nylon, generally have a high enough modulus to classify them as stiff relative to f-PVC, and are both difficult to seal and expensive. Low $M_n$ copolyamides, such as those used in the present invention, typically find use in low viscosity hot melt adhesives. As such, they have low melt strength, low tensile strength, poor processability on conventional extrusion equipment, adhesive type tackiness, and excessive cost.

Another effort to replace f-PVC with halogen-free polymers uses copolymers of olefins with acrylic acid esters (acrylates) or vinyl esters such as vinyl acetate (VA). Copolymers with higher levels (generally greater than (>) 15 wt %, based upon copolymer weight) of VA or methyl acrylate with ethylene, provide some measure of RF activity. While such olefin copolymers exhibit tensile and modulus properties similar to those of f-PVC and are of lower cost than TPU, nylon and PETG, they have a DLF significantly lower than that of f-PVC. The lower DLF effectively requires an increase in RF generator size with a concomitant increase in both capital expenses and power usage. These increases, when coupled with longer welding times, result in a higher final part cost.

An effort to avoid resorting to larger RF generators involves blending RF active inorganic or organic particulate additives, typically at high loading levels, into film-forming olefin polymer compositions. EP 193,902 discloses RF-sensitized compositions that include inorganic additives such as zinc oxide, bentonite clay, and alkaline earth metal aluminosilicates at levels of 1 to 20 wt %, based on composition weight. Patent Cooperation Treaty (PCT) Application Number WO 92/09415 describes incorporating RF receptors such as phosphonate compounds, phosphate compounds, quaternary ammonium salts, polystyrene sulfonate sodium salt, alkaline earth metal sulfate, and aluminum trihydrate into thermoset compounds and films. U.S. Pat. No. 5,627,223 discloses adding 1 to 50 wt % of starch (to impart RF weldability) to a polyolefin blend that also contains a coupling agent. Such additives improve RF weldability, but do so while adversely affecting other properties such as film optics and clarity, tensile strength and toughness.

WO 95/13918 discloses multi-layer structures that include a RF susceptible layer based on four components. The components are a propylene-based polymer, a nonpropylene polyolefin, a RF-susceptible polymer, and a polymeric compatibilizing agent. The RF-susceptible polymer may be any of EVA, EMA, ethylene/vinyl alcohol (EVOH), polyamides (including nylons), PVC, vinylidene chloride polymers, vinylidene fluoride polymers, and copolymers of bisphenol A and epichlorohydrins. The compatibilizing agent is a styrene/hydrocarbon block copolymer, preferably an SEBS block copolymer modified by a maleic anhydride (MAH), epoxy or carboxylate functionality.

WO 96/40512 discloses multi-layer structures comprising a skin layer, a barrier layer and a RF-susceptible layer. A combination of four polymers yields the RF-susceptible layer. The polymers are a propylene polymer, a non-propylene polyolefin, a RF-susceptible polymer and a polymeric compatibilizing agent. The RF-susceptible polymer may be an EVA or an EMA copolymer with a sufficient comonomer content, a polyamide, an EVOH copolymer, PVC, vinylidene chloride, a fluoride or a copolymer of bisphenol-A and epichlorohydrin. Styrene/hydrocarbon block copolymers, especially SEBS block copolymers modified with maleic anhydride (MAH), epoxy or carboxylate functionalities, serve as suitable compatibilizing agents.

WO 95/14739 discloses polymeric compositions suitable for use in articles such as medical packaging. The compositions comprise a heat resistant polymer, a RF-susceptible polymer and a compatibilizing polymer. The RF susceptible polymer may be selected from either of two groups of polar polymers. One group includes ethylene copolymers wherein the comonomer is selected from acrylic acid, methacrylic acid, ester derivatives of acrylic acid or methacrylic acid with alcohols having 1–10 carbon atoms ($C_{1-10}$), vinyl acetate and vinyl alcohol. The other group includes copolymers with segments of polyurethane, polyester, polyurea, polyimide, polysulfone or polyamide. The compatibilizer may be a styrenic block copolymer (e.g. SEBS), preferably MAH-fimctionalized.

European Patent Application (EP) 0 688 821 discloses a polyolefin composition that can be formed into sheets and films sealable with RF-generated dielectric heat. The composition comprises a heterophasic olefin polymer and 3–15% of at least one polymer having a dielectric heat loss factor (DHLF or DLF) of at least (>) 0.01. The heterophasic olefin polymer comprises a crystalline propylene homopolymer or copolymer, an optional crystalline ethylene copolymer, and an elastomeric ethylene/propylene (EP) copolymer. The heterophasic olefin polymer may be modified with 0.03 to 0.3% of at least one polar monomer, such as MAH. Polymers meeting the DHLF requirement include polyamides, vinyl polymers, polyesters and polyurethanes. Polyamides, especially those having a $M_n \geq 1000$, are preferred.

SUMMARY OF THE INVENTION

A first aspect of the present invention is a polymeric composition suitable for fabrication into a RF weldable film structure, the composition consisting essentially of a blend of a copolyamide and a polyolefin that has a carboxylic acid or carboxylic acid anhydride functionality, the blend having a DLF of at least 0.05 at a frequency of 27 megahertz (MHz) at 23° C. the copolyamide being present in an amount within a range of 20 to 80 percent by weight based on total blend weight.

Such polymeric compositions combine desirable characteristics of polyolefins (physical strength, processability and relatively low cost) with copolyamide RF activity to yield novel RF weldable film structures. The acid- or acid anhydride functionality appears to provide compatibility between two otherwise incompatible polymers, thereby leading to desirable blend homogeneity and consequent improved film properties relative to blends prepared from equal amounts of the same copolyamide and a non-functionalized polyolefin (the same polyolefin but without an acid or acid anhydride functionality).

A second aspect of the present invention is a RF weldable film structure comprising at least one layer formed from the polymeric composition of the first aspect. The film structure may be monolayer or multilayer. Multilayer structures may include one or more layers with a DLF of less than (<) 0.05 at a frequency of 27 MHz at 23° C.

A third aspect of the present invention is an article of manufacture fabricated from the film structure of the second aspect, the article being selected from the group consisting of bags, containers, packages, automotive interior trim fabrics and parts, flotation devices, tarps and tent coverings. Other suitable applications, some of which are more specific examples of the foregoing, include for example, medical or urological collection bags, medical ostomy bags, medical infusion or intravenous (IV) bags, inflatable devices such as air mattresses, flotation devices or toys, food packaging, retail product blister packaging, children's articles and toys, reinforced laminates for tents and tarpaulins, roofing membranes and geotextiles, and stationery applications such as binder covers. Compositions that yield the films of the present invention can also be extruded into tubing with a RF active outer layer. Such tubing can readily be used in conjunction with RF weldable films to provide a complete RF welded polyolefin film structure such as a medical collection bag. Skilled artisans can easily expand this illustrative listing to include virtually any device or application that requires a HF or RF sealable, flexible, mono-layer or multilayer film structure. The relatively low (compared to f-PVC) cost of polyolefin materials used to make the films of the present invention and the performance features of such film opens many opportunities for replacement of flexible, plasticized, halogenated films such as f-PVC.

DESCRIPTION OF THE PREFERRED EMBODIMENTS

Unless otherwise stated, each range includes endpoints used to establish the range.

The blend has a polyamide content sufficient to provide the blend with a DLF$\geq$0.05, preferably $\geq$0.10 at 27 MHz when tested at 23° C. The polyamide content is desirably $\geq$20 wt %, based on blend weight, preferably $\geq$30 wt %. Blends having such a polyamide content lead to short RF weld times using standard RF welding apparatus when compared with blends having a lower polyamide content. RF weld times may be as short as 0.5 to 1.0 second using a 2 kilowatt (KW) RF welding apparatus (commercially available from Callanan Company) operating at a frequency of 27.12 MHz and fitted with a brass seal bar of 0.5 inch (in) (1.3 centimeter (cm)) width by 8 in (20.3 cm length) and 4 square inch ($in^2$) ((26.4 square cm ($cm^2$)) area.

"DLF" is a calculated value determined by multiplying a material's dielectric constant (DC) by its dielectric dissipation factor (DDF) (or loss tangent). The DC and DDF are readily determined by instrumented dielectric testing methods. An especially preferred test fixture utilizes a Hewlett-Packard Impedance/Material Analyzer, model 4291B coupled with a Hewlett-Packard Dielectric Test Fixture, model 16453A. Dielectric properties can be measured on compression molded plaques (2.5 in (64 millimeters (mm) diameter and 0.050 in (1.3 mm) thick) formed from a material such as a polymer or a blended polymer compound.

"HF sealability" refers to bonding of a sealable polymer to a portion of itself or to another material using electromagnetic energy or waves over a broad frequency range of 0.1–30,000 MHz. This includes RF heating and microwave (MW) heating rather than conventional heat sealing. The HF range generically covers three frequency ranges more commonly referred to as an ultrasonic frequency range (18 kilohertz (KHz)-1000 KHz), the RF range (1 MHz–300 MHz), and the MW frequency range (300 MHz–10,000 MHz). The RF and MW ranges are of particular interest. The terms "activating", "sealing", "bonding", and "welding" (and variations of each word) are used interchangeably herein.

"RF active" means a material susceptible to dielectric activation via energy in the RF range, the application of which induces rapid heating of the material. Similarly "HF active" means a material susceptible to dielectric activation via energy in the HF range.

In general, skilled artisans regard a material with a DLF of <0.05 as RF or HF inactive. They classify materials with a DLF of 0.05–0.1 as weakly RF or HF active. They consider materials with a DLF above (>) 0.1 to have good RF or HF activity, and materials with a DLF above 0.2 to be very RF or HF active. While a DLF of 0.05 may produce satisfactory results, skilled artisans typically prefer a DLF>0.1, more often >0.2, in order to obtain sufficient sealing by application of HF waves in general and RF waves in particular.

Dimer acid copolyamides typically result from a polymerization reaction between a dimer fatty acid, such as azelaic acid, and at least one alkyl or cyclic diamine, such as ethylenediamine, hexamethylenediamine, piperazine, or propylene glycol diamine. The copolyamide desirably has an acid value within a range of 0.5–15 (milligrams (mg) of potassium hydroxide (KOH) per gram (g) of resin) and an amine value within a range of 1–50 (mg KOH/g of resin). The copolyamide beneficially has a ring and ball softening point (ASTM E-28) within a range of 80 to 190° centigrade (° C.), and more preferably 90 to 150° C. Low molecular weight copolyamides additionally have a low viscosity and an $M_n$ value of from 5,000 to 15,000. Typical Brookfield melt viscosities of low $M_n$ copolyamides range from about 900 to about 13,000 centipoise (cps), when tested at 190° C. according to ASTM D-3236. Copolyamides meeting these criteria typically find use in hot melt adhesive compositions, such as MACROMELT® (Henkel) and UNIREZ® (Union Camp). In order to be suitable for use in the present invention, the copolyamide must have a DLF>0.05 at 27 MHz when tested at 23° C., preferably ≧0.1.

Additional satisfactory low $M_n$ copolyamides derive from reaction products of caprolactam or laurylactam and water or hexamethylenediamine and adipic acid. Although similar in chemistry to high $M_n$. polymers known as nylon 6 or nylon 12, these copolyamides are primarily amorphous and have melting points and $M_n$. values substantially lower than conventional nylon resins. Desirable amorphous copolyamides have melting points of from 90 to 140° C. and weight average molecular weights ($M_w$) of from 10,000 to 25,000. They are sold under the trade name GRILTEX® (EMS-American Grilon or EMS-Chemie) as hot melt adhesives.

Because of the relatively low $M_n$ and low viscosity of the herein described copolyamide resins, they are difficult to process on conventional film or sheet extrusion equipment which has been designed for high molecular weight polymers. Additionally, the resins exhibit relatively low tensile and tear strength properties and are tacky or sticky when extruded into monolayer films. The present blend compositions overcome the limitations inherent in the low molecular weight copolyamide resins used in this invention.

With respect to polymers, "acid functionality" refers to polymers, particularly olefin polymers, having polymerized therein an ethylenically unsaturated carboxylic acid as well as polymers resulting from a reaction to graft such an acid onto a polymer backbone. Suitable acids include acrylic acid (AA) and methacrylic acid (MAA). Especially preferred acid functional olefin polymers are those produced from ethylene-based polymers and copolymers. Commercially available ethylene/acrylic acid (EAA) copolymers include PRIMACOR* resins (*trademark of The Dow Chemical Company). Commercially available ethylene/methacrylic acid (EMAA) copolymers include those commercially available from E. I. du Pont de Nemours and Company under the trade designation NUCREL®. Commercially available ethylene/methyl acrylate/acrylic acid terpolymers (EMAAA) include those commercially available from Exxon Chemical under the trade name ESCOR® ATX resins. The acid comonomer must be present in an amount of ≧3 wt %, preferably ≧6 wt %, based on polymer weight, in order to impart sufficient compatability of the olefin with the copolyamide. Especially preferred acid copolymers have AA or MAA content of 9 to 20 wt %. Acrylic acid grafted polyolefins include those commercially available from BP Chemical under the trade designation POLYBOND®.

Similarly, "anhydride functionality" refers to polymers resulting from a reaction to graft an ethylenically unsaturated carboxylic acid anhydride, such as maleic anhydride (MAH) onto a polymer backbone. Polyethylene (PE), polypropylene (PP) and ethylene copolymers, such as EVA serve as suitable backbone polymers. Commercially available MAH-grafted (MAH-g) polyolefins include BYNEL® CXA and FUSABOND® resins (E. I. du Pont de Nemours and Company), PLEXAR® (Equistar Chemicals) and LOTADER® (Elf Atochem). Typical MAH-g polymers have a MAH content of from 0.05 to 1.5 wt %, based on total polymer weight.

Ionomers function as suitable replacements for acid- and acid anhydride-functionalized polyolefins. "Ionomers" typically refers to ionomerized metal salts of carboxylic acid copolymers, such as sodium, potassium or zinc ionomers of EAA or EMAA. Commercially available ionomers include those available under the trade designation SURLYN® from E. I. du Pont de Nemours and Company.

The ionomers and the acid- or acid anhydride-functional olefin polymers typically have a density of 0.86–0.99 grams per cubic centimeter (g/cc), preferably 0.89 to 0.97 g/cc, and a melt index or $I_2$ value of 0.5–300 grams per 10 minutes (g/10 min) when tested at 190° C. and 2.16 kg (ASTM D-1238), preferably 2 to 20 g/10 min.

The polymer blends desirably have a copolyamide content of ≧20 wt % and an acid or acid anhydride functionalized polymer content of no more than (≦) 80 wt %, based on blend weight. The copolyamide content desirably ranges from 20 to 80 wt % with a complementary acid or acid anhydride functionalized polymer content range of 80 to 20 wt %. More preferably, the copolyamide content of blends is from 30 to 70 wt %, based upon blend weight. If the copolyamide is used at levels of <20 wt %, and especially at levels <10 wt %, the blend has too low a DLF to permit easy RF welding. At copolyamide levels >80 wt %, especially >90 wt %, the blend processes like a low melt strength copolyamide, is difficult to extrude on conventional extrusion equipment and exhibits poor melt strength, high tackiness or film blocking, and generally poor physical properties such as tensile strength, tear and impact strength.

The acid or anhydride functionalized polymer provides the blend with increased melt viscosity during extrusion processing, increased film strength and flexibility, increased adhesive peel strength and bond durability, and improved moisture resistance, all improvements and increases being relative to a blend lacking such a functionalized polyolefin. The copolyamide component provides the blend with sufficient DLF character to impart RF weldability. The copolyamide may also impart improved oxygen and carbon dioxide barrier properties to the blend. Additionally, the softening point of most copolyamides is >100° C., with many being >120° C., while the melting point of most acid functional ethylene polymers is slightly above or below 100° C. Thus, the copolyamide component of the blend can improve temperature stability and bond strength at elevated temperatures (>100° C.).

The polymer blends that form films of the present invention may also include one or more conventional additives that impart a functional attribute to the films, but do not significantly detract from film sealability via exposure to HF or RF irradiation. Such additives include, without limitation, antioxidant or process stabilizers, ultraviolet (UV) stabilizers, tackifiers, fire retardants, inorganic fillers, biocides, and pigments In addition to the copolyamide and acid functional olefin polymer required in polymeric compositions of the present invention, amounts of olefin polymers and copolymers can be added to achieve desired film attributes, as long as the composition contains ≧20 wt % copolyamide. Olefin polymers suitable for purposes of the present invention include homopolymers, such as PE or PP, and copolymers, such as ethylene/butene-1 (EB), ethylene/octene-1 (EO) or ethylene/ propylene (EP). Useful non-polar olefin polymers include low density polyethylene (LDPE), linear low density polyethylene (LLDPE), ultra low density polyethylene (ULDPE), high density polyethylene (HDPE), polyethylene plastomer (metallocene catalyst, 0.86–0.92 grams per cubic centimeter (g/cc) density, (mPE), PP homopolymer, PP copolymer (co-PP), EVA, EMA, ethylene/n-butyl acrylate (EnBA), ethylene/ethyl acrylate (EEA), EAA, EMAA, EMAAA, ionomerized metal salts of carboxylic acid copolymers, such as sodium, potassium or zinc ionomers of EAA or EMAA, ethylene/propylene/diene copolymer, (EPDM), ethylene/styrene interpolymer (ESI), EVOH, polybutene (PB), polyisobutene (PIB), styrenelbutadiene (SB) block copolymer, styrene/isoprene/styrene (SIS) block copolymer, styrene/ethylene-butene/styrene (SEBS) block copolymer or MAH-g olefin polymers such as MAH-g-EVA, MAH-g-PE and MAH-g-PP and MAH-g styrenic block copolymers such as SEBS-g-MAH.

The films of the present invention may be of any gauge that serves a given need, but typically fall within a range of from 1 to 100 mils (25 to 2500 micrometers ($\mu$m)), preferably 2 to 20 mils (50 to 500 $\mu$m). Any conventional film forming process may be used to fabricate such films. Illustrative processes include, without limitation, an annular extruded blown film process, a slot die cast extrusion film process, and extrusion coating of one or more layers upon a film or substrate. The films of the present invention can be monolayer films or function as one or more layers of a multi-layer film construction. Such multi-layer films preferably result from coextrusion processes as well as lamination processes. Additionally, HF active blend compositions of the current invention can be fabricated into extruded profile shapes such as tubing. For example, a RF-weldable monolayer or coextruded, multi-layer, tubular structure may be bonded to a film or other substrate to fabricate a composite part such as a medical collection bag. In addition, the polymer blend compositions described herein can be dissolved in solvent or dispersed as an aqueous dispersion or emulsion and coated from a liquid phase using conventional liquid coating processes.

In a preferred embodiment of the present invention, the polymeric composition or RF active polymer blend can be coextruded, or otherwise assembled into a multi-layer composite, with a non-RF active or weakly RF active polymer layer. The incorporation of a RF active layer with a non-RF layer into a coextruded film structure desirably allows the entire film to be RF welded. Especially preferred film structures of the present invention can be denoted as "AB" or "ABA" or "BAB" wherein the "A" layer is non-RF or weakly RF active and the "B" layer is the RF active polymer blend composition of the present invention. Additional non-RF or weakly RF active layers "C" can be also incorporated, such as in a "ABC" coextrusion. Skilled artisan readily understands that these structures merely illustrate a wide variety of foreseeable structures.

Any of the films described herein can be sealed or welded to itself or to another substrate using a conventional HF sealer, such as a RF sealer. Commercially available RF welders, such as those available from Callanan Company, Weldan, Colpitt, Kiefel Technologies, Thermatron, Radyne and others, typically operate at a frequency of 27.12 MHz. Two less frequently used radio frequencies are 13.56 MHz and 40.68 MHz. Typical MW sealing or welding apparatus function at frequencies of 2450 MHz (2.45 gigahertz or GHz), 5.8 GHz and 24.12 GHz. When using RF sealers, the die or tooling can operate at ambient room temperature (nominally 23° C.) or can be preheated to temperatures such as 40° C. or 60° C. Slightly elevated temperatures can improve RF activation and reduce seal time.

RF or MW activation (sealing and bonding) offers a performance advantage over conventional thermal or heat sealing when rapid sealing becomes a dominant factor, such as is the case in high speed manufacturing. HF (including RF and MW) bonding technologies allow energy to be concentrated at the HF active layer, thus eliminating a need to transfer heat through an entire structure. This advantage becomes more evident with increasing film gauge, particularly for relatively thick (gauge >5 mils or 125 $\mu$m) films where conventional thermal sealing techniques require relatively (compared to RF sealing) long contact times to permit thermal transfer through the film to the bonding interface. For example, RF sealing can occur in as little as 0.4 second whereas conventional thermal contact or impulse sealing of a film having the same thickness typically requires at least several seconds to attain a comparable seal. HF bonding or sealing also has an advantage over conventional thermal sealing when a composite structure contains a thermally sensitive material, such as a color sensitive dyed fabric or nonwoven material or an oriented film that can soften and undesirably shrink upon heating. RF dies can also be fabricated in very complex shapes, a difficult task when dealing with thermal sealing equipment.

The films of the present invention facilitate fabrication of a variety of structures via HF sealing. For example, a film can be folded over and at least partially HF sealed to itself to form a bag or a pouch. Two plies of the same film readily form a like bag or pouch without a fold. HF sealing also promotes bonding of such a film to a substrate such as a different film, a nonwoven fabric, an injection molded or extruded part, or paper. For most applications, sufficient HF sealing or bonding equates to an adhesive strength of at least 4 pounds per inch (lb/in) (0.72 Newton per millimeter (N/mm)). Medical collection bags or drainage pouches require that an RF weld between two plies of film have a strength that exceeds tear strength of the film itself. In other words, an effort to peel the films apart results in tearing at least one of the films. An RF weld or seal adhesive strength of at least 4 lb/in (0.72 N/mm), as tested by the 180 degree (180°) peel test of ASTM D-903, meets this requirement. Thicker film structures, such as those used for inflatable applications, generally require even greater weld or bond strengths. Films similar to those of the present invention, but with a DLF<0.05, do not facilitate HF sealing and typically yield peelable seals that fail the above adhesive strength requirements when exposed to the same level of HF radiation.

Notwithstanding emphasis upon HF weldability, film structures or films of the present composition can also be thermally laminated, sealed or welded using conventional thermal processes such as hot roll lamination, flame lamination, and heat sealing. With this capability, one can combine a thermal process with HF welding. One illustration of such a combination involves a first step of thermally laminating a film of the present invention to a substrate such as a fabric thereby forming a film/fabric composite and a second, sequential step of HF welding two composites together at a film/film interface, thereby providing film interior surfaces and fabric exterior surfaces. Additional substrates of interest onto which films of the present invention can be laminated include cellular foams, such as polyurethane or polyolefin foams, woven or nonwoven fabrics, paper or paperboard products, thermoplastic film or sheet, wood veneer or wood products, and wood or cellulosic composites.

The following examples illustrate, but do not limit, the present invention. Arabic numerals or combinations of Arabic numerals and letters of the alphabet denote examples (Ex) of the present invention. Letters of the alphabet standing alone represent comparative examples (Comp Ex).

EXAMPLE 1

DLF Determination

Subject several polymer materials to DLF testing using the apparatus and procedure detailed above. The materials and their corresponding DLF values are as follows: LDPE (LDPE 501, 0.922 g/cc density, melt index of 1.9 g/10 min, The Dow Chemical Company) <0.001; EAA with a 9.7 wt % acrylic acid (AA) content (EAA-1) (PRIMACOR* 1430, melt index of 5 g/10 min, The Dow Chemical Company)= 0.003; EAA with a 20 wt % AA content (EAA-2) (PRIMACOR* 5980, melt index of 300 g/10 min, The Dow Chemical Company)=0.007; EAA with a 9.7 wt % AA content (EAA-3) (PRIMACOR* 3460, melt index of 20 g/10 min, The Dow Chemical Company)=0.007; copolyamide number 1 (CPA-1) (MACROMELT® 6211, Henkel)= 0.221; CPA-2 (MACROMELT® 6238, Henkel)=0.082; CPA-3 (MACROMELT® 6206, Henkel)=0.057; CPA-4 (GRILTEX® 1G, EMS-Chemie)=0.11; CPA-5 (GRILTEX® D1330, EMS-Chemie)=0.07; CPA-6 (GRILTEX® D1472, EMS-Chemie)=0.08; blend number 1 (B-1), a blend of 80% EAA-1 and 20% CPA-1=0.03; B-2, a blend of 60% EAA-1 and 40% CPA-1=0.06; and B-3, a blend of 40% EAA-1 and 60% CPA-1=0.083; ionomer-1 (SURLYN® 1605, E. I. du Pont de Nemours and Company)=0.008; Ionomer-2 (SURLYN® 1702, E. I. du Pont de Nemours and Company)=0.003. * Means Trademark of The Dow Chemical Company.

EXAMPLE 2

Monolayer Film Seal Testing

Use a conventional slot die cast film line with a 2.5 in (6.4 cm) diameter, 24:1 length to diameter ratio (L/D) single screw extruder operating at a temperature of 300° Fahrenheit (° F.) (149° C.) and a 28 in (71 cm) wide slot die operating at a temperature of 300° F. (149° C.) to cast a melt-processible polymer composition onto a chilled (75° F. (25° C.)) casting roll to form a 4 mil (102 Jm) monolayer film and thereafter wind the film into a roll. The melt-processible polymer compositions include 3 parts by weight (pbw) of CN-744 antiblock concentrate (20 wt % $SiO_2$ in LDPE) and 2 pbw of CN-4420 slip/antiblock concentrate (20 wt % silicon dioxide ($SiO_2$), 4 wt % stearamide and 4 wt % erucylamide in an EVA carrier) per 100 pbw of polymer. Southwest Plastics supplies the latter two materials.

Dielectrically seal two plies of each film together using a Callanan 2.0 kW RF welding machine operating at 50% power setting fitted with a non-heated 0.5 in (1.25 cm) wide by 8 in (20.3 cm) long bar seal die and a one second seal time. Cut the film into 1 in (2.5 cm) wide strips perpendicular to the seal. Subject the strips to 180° peel testing using an Instron tensile tester at a pull rate 12 in/min (30.5 cm/min) in accordance with American Society for Testing and Materials (ASTM) test D-903.

The film compositions and corresponding seal strengths are as follows: 100% EAA-1—no measurable seal; 80% EAA-1/20% CPA-1=4.15 pounds/inch (lb/in)/0.73 Newtons/millimeter (N/mm); 60% EAA-1/40% CPA-1= 4.75 lb/in (0.83 N/mm); and 40% EAA-1/60% CPA-1=>6 lb/in (1.05 N/mm). CPA-1 has a ring and ball softening point of 145° C., an acid value of 2–10 mg KOH/g resin, an amine value <2 mg KOH/g resin, and melt viscosity of about 5,000 cps at 190° C.

The peel test data demonstrate that while a polyolefin film with no copolyamide typically cannot be RF sealed, blending as little as 20 wt % of a copolyamide with a polyolefin leads to satisfactory adhesion strength. Increasing copolyamide levels (e.g. 40 wt % and 60 wt % CPA-1) lead to stronger adhesion strength ratings.

EXAMPLE 3

Prepare a monolayer copolyamide/polyolefin blend 5.0 mil (125 $\mu$m) film on a conventional blown film line using a 1 in (2.5 cm) diameter extruder feeding into a 1 in (2.5 cm) diameter die. Ramp the extruder zone temperatures from 280° F. (138° C.) to 330° F. (165° C.) with the die operating at 330° F. (165° C.). The film comprises 55% BYNEL CXA 3101 (E. I. du Pont de Nemours and Company, acid modified EVA resin with 3.5 g/10 minute melt index, 0.96 g/cc density), 30% CPA-1, 10% LDPE 501I (same as in Ex 1) and 5% CN734 antiblock concentrate (Southwest Plastics, 15% $sio_2$ in LDPE). The resulting film exhibits a machine direction (MD) ultimate tensile strength of 1360 psi (9.4 $N/mm^2$), ultimate elongation of 560%, 2% secant modulus of 5,020 psi (34.6 $N/mm^2$), Elmendorf tear strength 160 g/mil (6.3 grams per micrometer (g/$\mu$m) and Spencer impact strength of 270 g/mil (10.5 g/$\mu$m). The film has a DLF of 0.08.

Dielectrically seal two plies of the film together as in Ex 2, but with a 0.5 second low power preheat and 1.0 second RF seal time followed by 0.5 second dwell time (no power) and a Clayton air capacitor plate setting of 22. This yields a high strength seal (>6.0 lb/in (1.05 N/mm)). The seal is strong enough to promote film breakage before seal failure.

EXAMPLE 4

Replicate Ex 3, but with a blend of 40 wt % EAA-1, 40 wt % CPA-1, 15 wt % of the same LDPE as in Ex 3 and 5 wt % of the same antiblock concentrate as in Ex 3. The film has a MD ultimate tensile strength of 1560 psi (10.8 $N/mm^2$), ultimate elongation of 530%, 2% secant modulus of 7,050 psi (48.6 $N/mm^2$), Elmendorf tear strength 160 g/mil (6.2 g/$\mu$m) and Spencer impact strength of 260 g/mil (10.1 g/$\mu$m).

Dielectric sealing of two plies of the film together yields a peel strength >5.5 lb/inch (1.0 N/mm).

EXAMPLE 5

Replicate Ex 3, but with a blend of 75 wt % SURLYN® 1605 (E. I. du Pont de Nemours and Company), 20 wt % CPA-1, and 5% of the same antiblock concentrate as in Ex 3. The film exhibits a machine direction (MD) ultimate tensile strength of 2640 psi (18.2 $N/mm^2$) ultimate elongation of 215%, 2% secant modulus of 27,300 psi (188.3 $N/mm^2$), and Spencer impact strength of 300 g/mil (11.7 g/$\mu$m). The film has a DLF of 0.06.

EXAMPLE 6

Coextrude a 3-layer 7.4 mil (188 μm) film using a conventional upward blown film line equipped with a 5 in (12.7 cm) diameter die and three 2.5 in (6.4 cm) extruders. The film has a symmetrical ABA structure where the innermost and outermost layers "A" comprise 15% each (1.1 mil, 28 μm) of the overall film gauge and the core "B layer comprises 70% (5.2 mil, 131 μm) of the film thickness. The skin "A" layers comprise 95 wt % EAA-1 and 5 wt % of the same antiblock concentrate as in Ex 3. The "B" or core layer comprises 60 wt % EAA-1 and 40 wt % CPA-1. All three extruders are zone ramped from 275° F. (135° C.) to 330° F. (166° C.) with the die zones set at 330° F. (166° C.). This produces a 16 in (41 cm) wide lay-flat bubble. The resulting film has a Spencer impact Strength of 595 μg/mil (23.2 g/μm), an oxygen transmission rate ($O_2$TR)of 375 cc-mil/100 in$^2$-day (147 cc-mm/m$^2$-day), and a water vapor transmission rate (WVTR) of 4.1 /g-mil/100 in$^2$-day (1.62 g-mm/m$^2$-day). Table I below presents additional film physical property data (measured in both MD and transverse direction (TD)).

TABLE I

| | MD | TD |
|---|---|---|
| Ultimate Tensile Strength (psi/(N/mm$^2$)) | 2640/18.2 | 2295/15.8 |
| Ultimate Elongation (%) | 470 | 540 |
| 2% Secant Modulus (psi/(N/mm$^2$)) | 7540/52.0 | 7520/51.9 |
| Elmendorf Tear Strength (g/mil/(g/μm)) | 250/9.8 | 350/13.6 |

Core layer "B" has a DLF of 0.06. Dielectrically seal two plies of the film together as in Ex 3 but with a 1.5 second (sec) RF seal time and a Clayton air capacitor plate setting of 23. The resulting seal has a peel strength of >7.1 lb/in (1.2 N/mm), with the film breaking prior to seal failure.

EXAMPLE 7

Replicate Ex 6 to prepare a coextruded, asymmetrical (AB configuration) 2-layer 9.0 mil (228 μm) film but use two extruders rather than three. Layer "A", nominally the innermost layer, provides 50% (4.5 mil, 114 μm) of the overall film gauge and has the same composition as Layer A of Ex 6. Layer "B", nominally the outermost layer, provides 50% (4.5 mil, 114 μm) of the overall film gauge and comprises 55 wt % EAA-1, 40 wt % CPA-1 and 5 wt % of the antiblock concentrate of Ex 3. The resulting film has a Spencer impact Strength of 590 g/mil (23.0 g/μm), an $O_2$TR of 330 cc-mil/100 in$^2$-day (130 cc-mm/m$^2$-day), and a WVTR of 2.4 g-mil/100 in$^2$-day (0.95 g-mm/m$^2$-day). Table II below presents additional film physical property data (both MD and TD).

TABLE II

| | MD | TD |
|---|---|---|
| Ultimate Tensile Strength (psi/(N/mm$^2$)) | 2930/20.2 | 2670/18.4 |
| Ultimate Elongation (%) | 475 | 495 |
| 2% Secant Modulus psi/(N/mm$^2$)) | 9970/68.8 | 9620/66.3 |
| Elmendorf Tear Strength (g/mil/(g/μm)) | 240/9.4 | 295/11.5 |

Outer layer "B" has a DLF of 0.06. Dielectric sealing of two plies of the film together using the same conditions as those of Ex. 6, with "B" layers adjacent to each other yields a peel strength of >5.0 lb/in (0.9 N/mm).

What is claimed is:

1. A polymeric composition suitable for fabrication into a radio frequency weldable film structure, the composition consisting essentially of a blend of a copolyamide and an RF inactive polyolefin that has a carboxylic acid functionality and an acid comonomer content of at least three weight percent, based on total polyolefin weight, the blend having a dielectric loss factor of at least 0.05 at a frequency of 27 megahertz at 23° centigrade, the copolyamide being present in an amount within a range of from 35 to less than 60 percent by weight, based on total blend weight; wherein the RF inactive polyolefin with carboxylic acid functionality has a melt index of 0.5 to 300 grams per 10 minutes (190° C., 2.16 Kg) according to ASTM D-1238.

2. The composition of claim 1, wherein the copolyamide is derived from a dimeric fatty acid.

3. The composition of claim 1, wherein the polyolefin is an ethylene/acrilic acid copolymer or an ethylene/methacrylic acid copolymer.

4. The composition of claim 1, wherein the polyolefin is a base polyolefin having grafted thereto at least one monomer selected from the group consisting of ethylenically unsaturated carboxylic acids.

5. The composition of claim 4, wherein the base polyolefin is selected from the group consisting of linear low density polyethylene, low density polyethylene, ultra low density polyethylene, copolymers of ethylene and at least one alpha-olefin monomer, linear ethylene/alpha-olefin copolymers, substantially linear ethylene/alpha-olefin copolymers, propylene polymers and copolymers and copolymers of ethylene and less than 30 weight percent, based on copolymer weight, of a polar monomer.

6. The composition of claim 5, wherein the polar monomer is selected from the group consisting of vinyl acetate, methyl acrylate, acrylic acid and methacrylic acid.

7. The composition of claim 5, wherein the alpha-olefin monomer contains from 3 to 20 carbon atoms.

8. The composition of claim 5, wherein the polyolefin is an ethylene/alpha-olefin copolymer having a density within a range of from 0.86 to 0.94 grams per cubic centimeter.

* * * * *